United States Patent [19]

Inoue et al.

[11] 4,307,279

[45] Dec. 22, 1981

[54] ELECTRODE ASSEMBLY FOR TRAVELLING-WIRE ELECTROEROSION MACHINE

[75] Inventors: Kiyoshi Inoue, Tokyo; Akihiko Shimizu, Iseharashi, both of Japan

[73] Assignee: Inoue-Japax Research Inc., Yokohama, Japan

[21] Appl. No.: 897,053

[22] Filed: Apr. 17, 1978

[30] Foreign Application Priority Data

| Apr. 18, 1977 | [JP] | Japan | 52/44383 |
| Jun. 15, 1977 | [JP] | Japan | 52/69800 |
| Jun. 15, 1977 | [JP] | Japan | 52/77153[U] |
| Jul. 11, 1977 | [JP] | Japan | 52/81961 |
| Aug. 4, 1977 | [JP] | Japan | 52/92974 |

[51] Int. Cl.$^3$ ............................................. B23P 1/12
[52] U.S. Cl. ............................. 219/69 W; 219/69 E; 219/69 M
[58] Field of Search .............. 219/69 W, 69 G, 69 M, 219/69 E, 124.34

[56] References Cited

U.S. PATENT DOCUMENTS

| 3,731,043 | 5/1973 | Ullmann et al. | 219/69 W |
| 3,731,044 | 5/1973 | Ullmann et al. | 219/69 W |
| 3,752,950 | 8/1973 | Castonguay | 219/69 W |
| 4,123,645 | 10/1978 | Shichida et al. | 219/69 W |

FOREIGN PATENT DOCUMENTS

| 1331672 | 9/1973 | United Kingdom . |
| 1451135 | 9/1976 | United Kingdom . |
| 475245 | 10/1975 | U.S.S.R. .......................... 219/69 W |

*Primary Examiner*—C. C. Shaw
*Attorney, Agent, or Firm*—Karl F. Ross

[57] ABSTRACT

A traveling-wire electro-erosion machine which has a head assembly comprising a tubular support formed with a plurality of roller guides positioned to define a path for a traveling wire forming an electrode for electroerosion. Above the tubular support, there is provided a boxlike housing with a supply wheel and a takeup wheel for the wire and a bevel gear on the tubular support cooperates with a pinion on a motor which enables rotation of the entire assembly. A worm-gear arrangement may be used instead of the bevel gears and a different construction of the guide rollers may be provided as well, e.g. on the downwardly extending projection from the tubular body.

20 Claims, 14 Drawing Figures

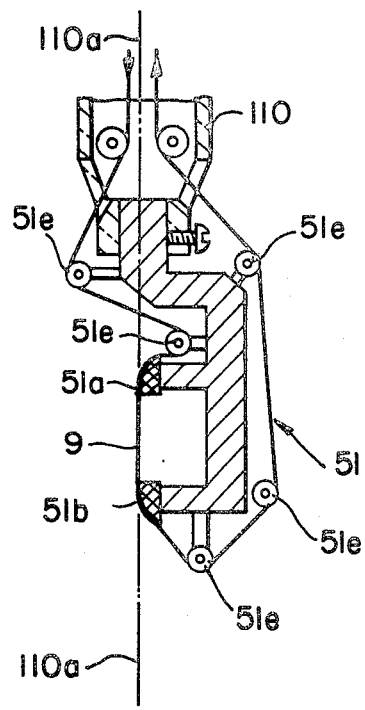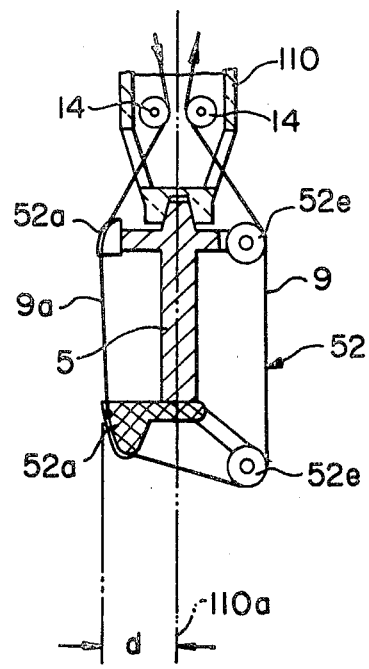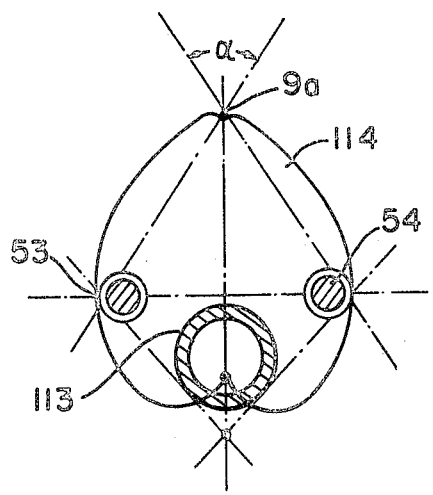

F I G. 9
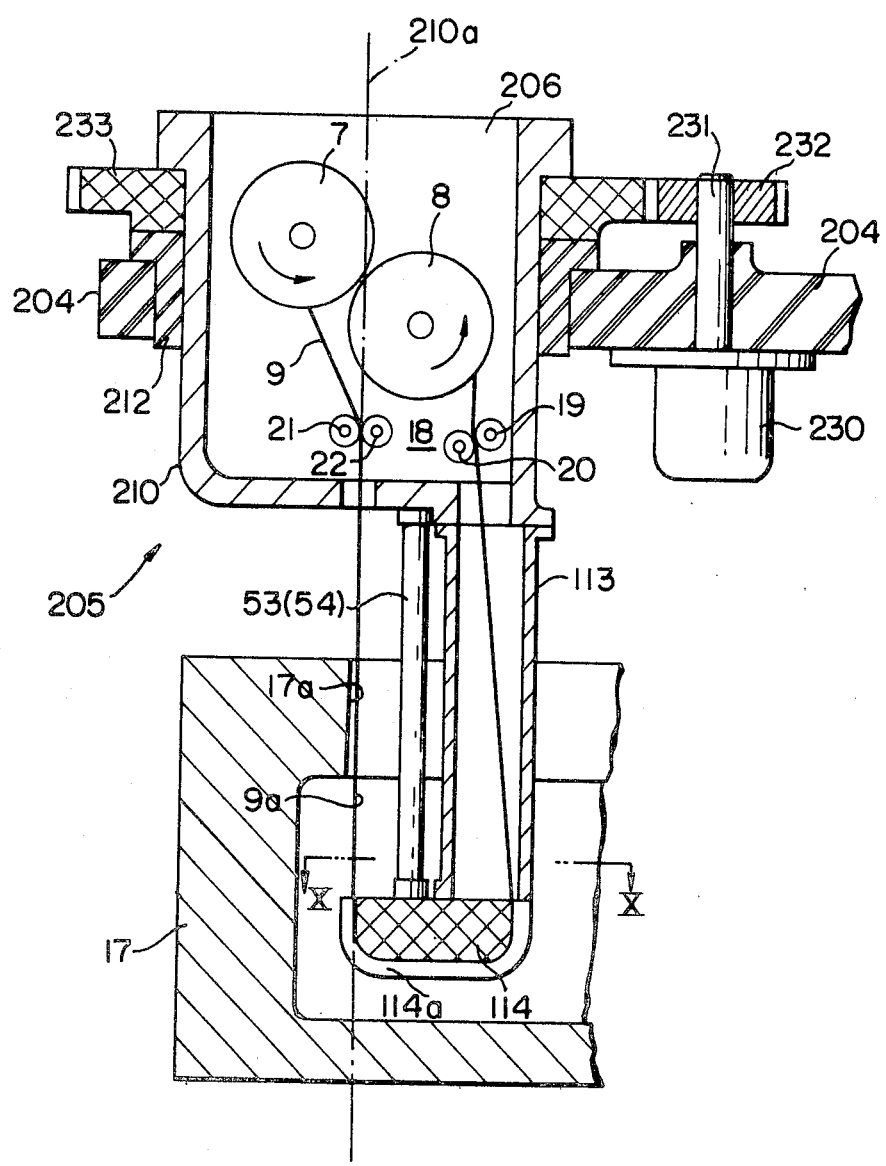

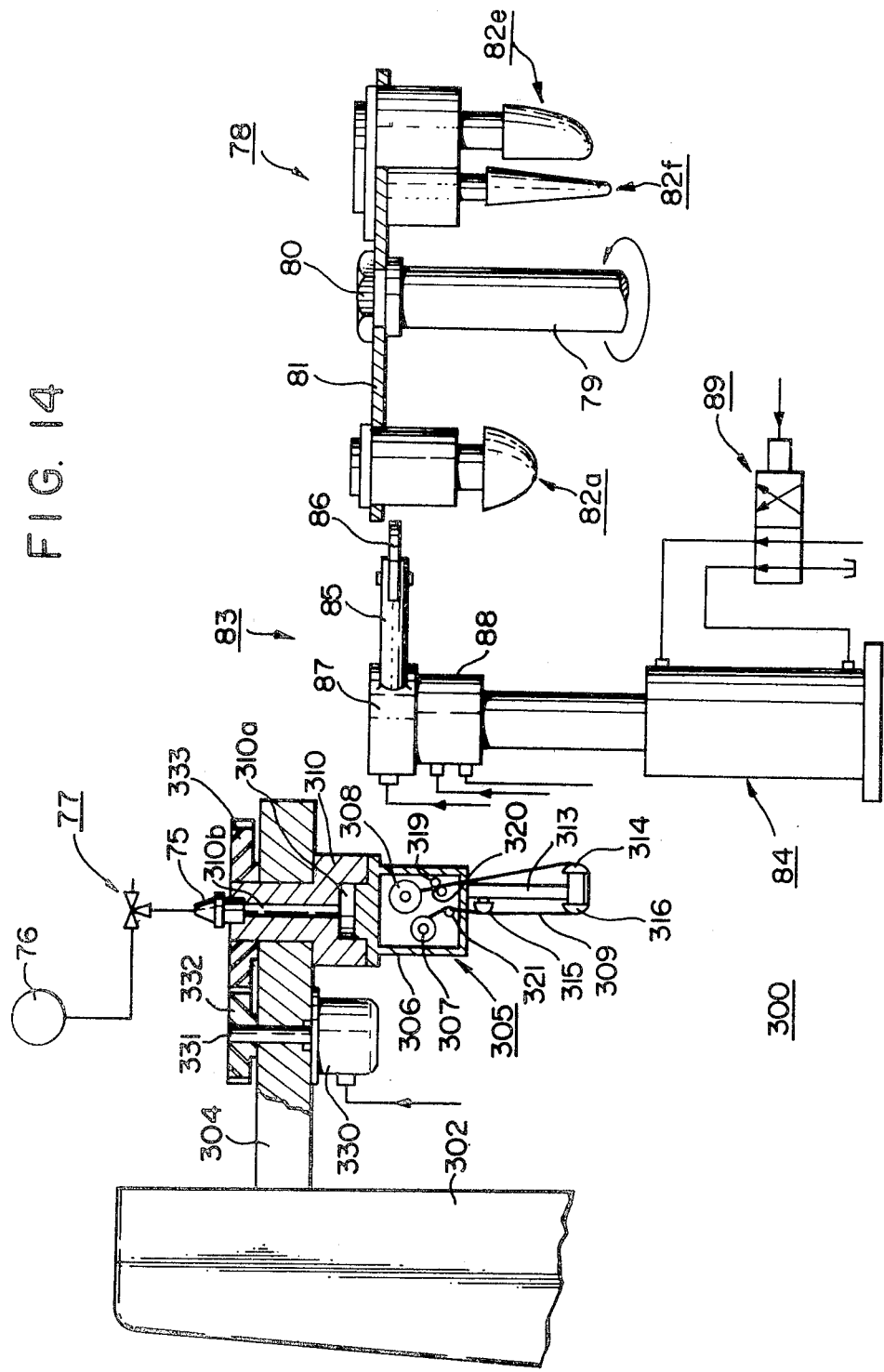

4,307,279

ELECTRODE ASSEMBLY FOR TRAVELLING-WIRE ELECTROEROSION MACHINE

FIELD OF THE INVENTION

The present invention relates to an electrode assembly for a travelling-wire electroerosion (EDM) machine.

BACKGROUND OF THE INVENTION

In conventional travelling-wire electroerosion machines, wire-electrode feed assemblies are commonly utilized having a configuration such that the wire electrode fed from a supply reel, which is provided on the machine column or on the frontal wall of the machine, is advanced through one of two arms attached to the machine column or is otherwise fed along the frontal wall to reach the vicinity of an end thereof, wherefrom the wire under tension is advanced via the other arm for take-up by a take-up reel which is also provided on the machine column.

Electroerosion machines with such travelling electrode assemblies lack flexibility or versatility in that they do not lend themselves to a certain kinds of important applications. For example, they are not amenable to counter-machining of the head portion of an I-shaped member as encountered, for example, in machining of a hollow portion of an extrusion die and an edge portion of a trimming die, and are thus quite inconvenient.

OBJECTS OF THE INVENTION

It is, therefore, an object of the present invention to provide an improved electrode assembly for travelling-wire electroerosion machine which permits practically unlimited types of travelling-wire electroerosion machining, especially the difficult applications mentioned above.

Another object of the invention is to provide an improved electro-erosion machine incorporating the herein-proposed new electrode assembly.

SUMMARY OF THE INVENTION

The electrode assembly according to the present invention comprises a base member for mounting thereon a wire-electrode supply member and a wire-electrode take-up member; a plurality of guide members for guiding under tension the travelling-wire electrode along a predetermined path including a machining region comprised of the travelling wire electrode and a workpiece juxtaposed therewith in the presence of a machining medium; a carriage adapted to be coupled rotatably to an arm member mounted displaceably to the electroerosion machine, the carriage carrying said base member and including a support member for supporting and positioning at least in part of the guide members at predetermined locations; drive means for advancing the wire electrode from the supply member to the take-up member along said predetermined path; and a rotary mechanism operable in response to a control signal for rotating said carriage to control the angular position thereof relative to said arm member.

A pair of electrode guides are included in the guide members and are arranged preferably such that the axis of that portion of the wire electrode which is juxtaposed with the workpiece in the machining region coincides with the rotary axis of said carriage.

In order to allow taper-cutting of workpieces, said support member has an electrode-guide holder portion which holds a plurality of guides relatively displaceable in mutually orthgonal directions to variably set the inclination of the wire electrode guided thereby and the workpiece surface juxtaposed therewith. Alternatively, a plurality of such holders or wire-guide units having different angular and other wire-spanning configurations may be prepared in order that they may be replaceablly attached to said support member or carriage for different machining purposes as desired.

In accordance with a further aspect of the present invention, there is provided an improved electroerosion machine which incorporates at least one travelling-wire electrode assembly of the aforedescribed type, of which at least part is carried in a tool storage magazine which also carries a plurality of three-dimensional or cavity-sinking electroerosion electrodes diverse in shape and size and is provided with an automatic tool changing unit for any desired machining operation on fully automatic basis and with utmost efficiency.

BRIEF DESCRIPTION OF THE DRAWING

These and other objects, features and advantages of the invention will become more readily apparent from the following description of certain embodiments thereof with reference to the accompanying drawing in which:

FIGS. 3 to 8 illustrate in sectional view various embodiments of the electrode assembly according to the invention;

FIG. 9 is a sectional view illustrating a further embodiment of the invention;

FIG. 10 is a cross-sectional view of the electrode assembly taken along the line X—X in FIG. 9;

FIG. 14 is a side view diagrammatically showing the machine taken along the lines ABCD in FIG. 13.

SPECIFIC DESCRIPTION

Figure 1:
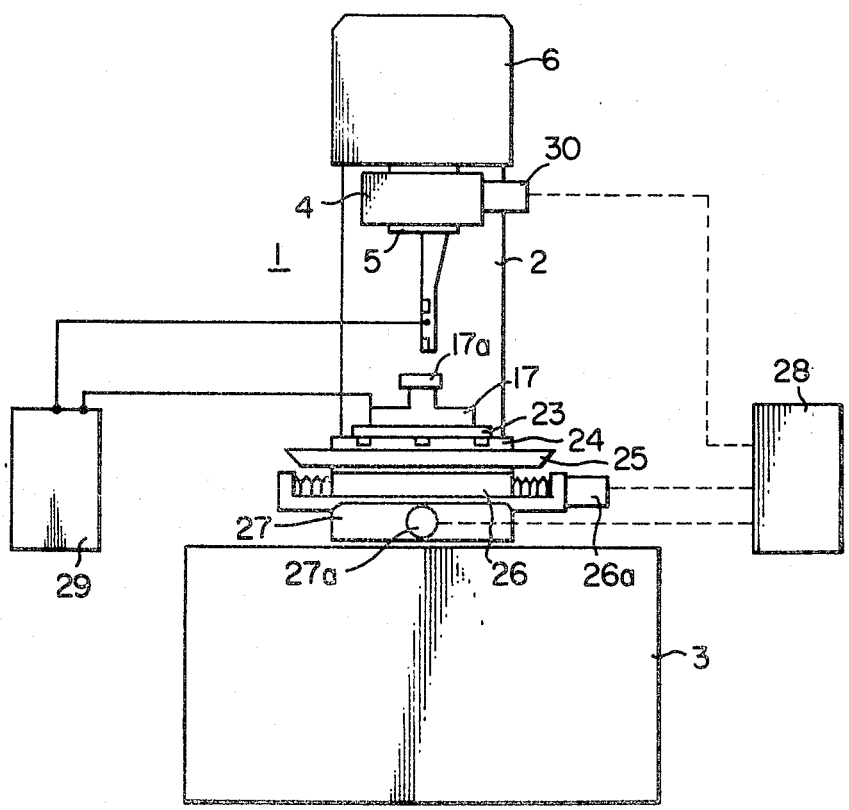
FIG. 1 is a front-elevational view of a travelling-wire electroerosion machine including an electrode assembly according to the invention.
Figure 2:
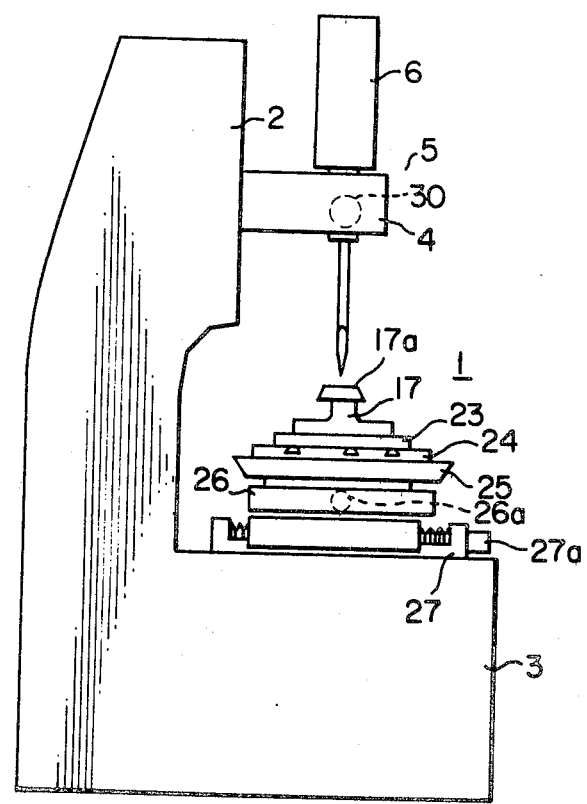
FIG. 2 is a side elevational view of the machine of FIG. 1.

Referring now to FIGS. 1 and 2, there is shown diagrammatically an electroerosion machine 1 having a column 2 standing upright from a machine bed 3 as in conventional designs. The machine 1 has a tool arm 4 mounted to be vertically displaceable on the column 2. The tool arm 4 is here designed to carry an electrode assembly 5, according to the invention, to be described in detail hereinafter and is brought up and down to a position where electroerosion is to be carried out with the machining portion of the electrode assembly 5.

Figure 3:
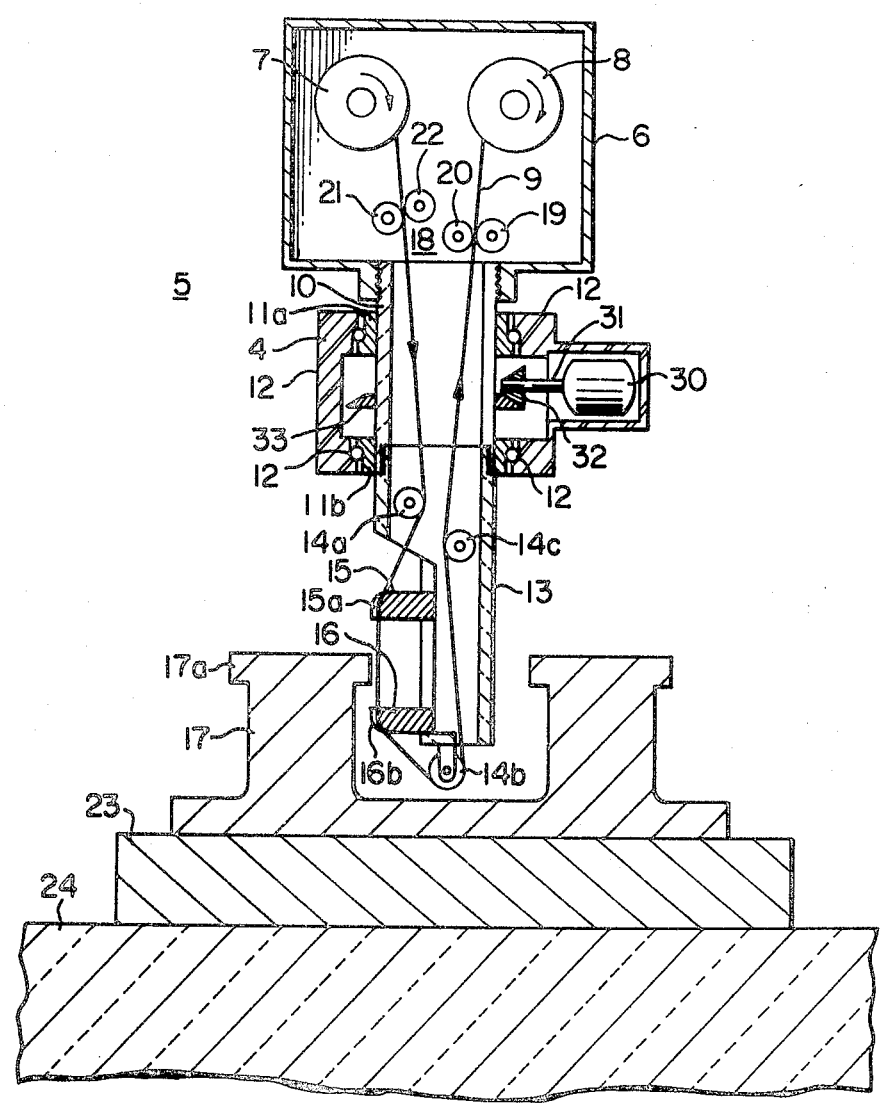

Referring to FIG. 3, the electrode assembly 5 comprises a base 6 which may be in the form of a basket, casing, board or plate and has a supply reel 7 and a take-up reel 8 mounted on the base for a wire electrode 9. Shown threadedly fixed to the base 6 is a cylinder 10 received in a pair of rings 11a and 11b which are in turn rotatably received through bearings 12 within the tool arm 4 which has been shown in FIGS. 1 and 2. Shown also threadedly fixed to the cylinder 10 is a support arm 13 which carries a plurality of guide rollers 14a, 14b, 14c and further holds a pair of electrode guides 15 and 16 each having a guide grooves 15a, 16b for the wire electrode 9 to cause it to smoothly run closedly in juxtaposition with a workpiece 17. The cylinder 10 forms a carriage for the base 6 and the support arm 13. Drive means, generally designated by numeral 18, for displacing the wire electrode 9 under sufficient tension is here mounted on the base 6 and comprises a drive roller 19 and a pinch roller 20 therefor and a brake roller 21 and a pinch roller 22 therefor. These driving and braking elements are well known in the art and may take any form which is conventional.

The workpiece 17 is shown mounted on a current-conducting plate or table 23 which is in turn mounted on a main table 24. The main table 24 is in turn placed in a work tank as in conventional practice as shown in FIGS. 1 and 2, X-Y cross tables 26 and 27 on which the work tank 25 is mounted are provided which are driven by X-axis feed motor 26a and Y-axis feed motor 27a through their respective lead screws in response to drive control signals fed from a numerical control unit 28 to displace the workpiece 17 along a predetermined path.

A power supply for applying an electric energy between the workpiece 17 (through the plate 23) and the wire electrode 9 (through, for example, the guide 14b) is designated at 29 in FIG. 1. While a cutting operation is being carried out, a machining fluid (e.g., distilled water) is supplied to the cutting region to serve as a machining medium and also to remove eroded material from the cutting zone.

The workpiece 17 is here a hollow body of which upper overhung portion (annular) 17a is to be machined and the area in which machining is carried out will not be sufficiently wide relative to the size of the wire-electrode support arm 13 so that the displacement of the workpiece 17 may be disturbed by contact or collision with the arm 13. This difficulty is overcome by changing the orientation of the arm 13 relative to the workpiece 17 as the machining proceeds. To this end, a rotary mechanism for the carriage 10 is provided including a motor 30 the end of whose drive shaft 31 is provided with a bevel gear or worm 32 which is in engagement with a bevel gear or worm wheel 33 attached around the cylinder 10. Thus, the rotation of the carriage 10 is effected responsive to the rotation of the motor 30, which in turn operates in response to drive signal from the NC unit 28 (FIG. 1) programmed or generated therein in conjunction with X-axis and Y-axis feed signals to displace the workpiece 17 in a predetermined cutting path along its upper overhung portion 17a.

Figure 4:
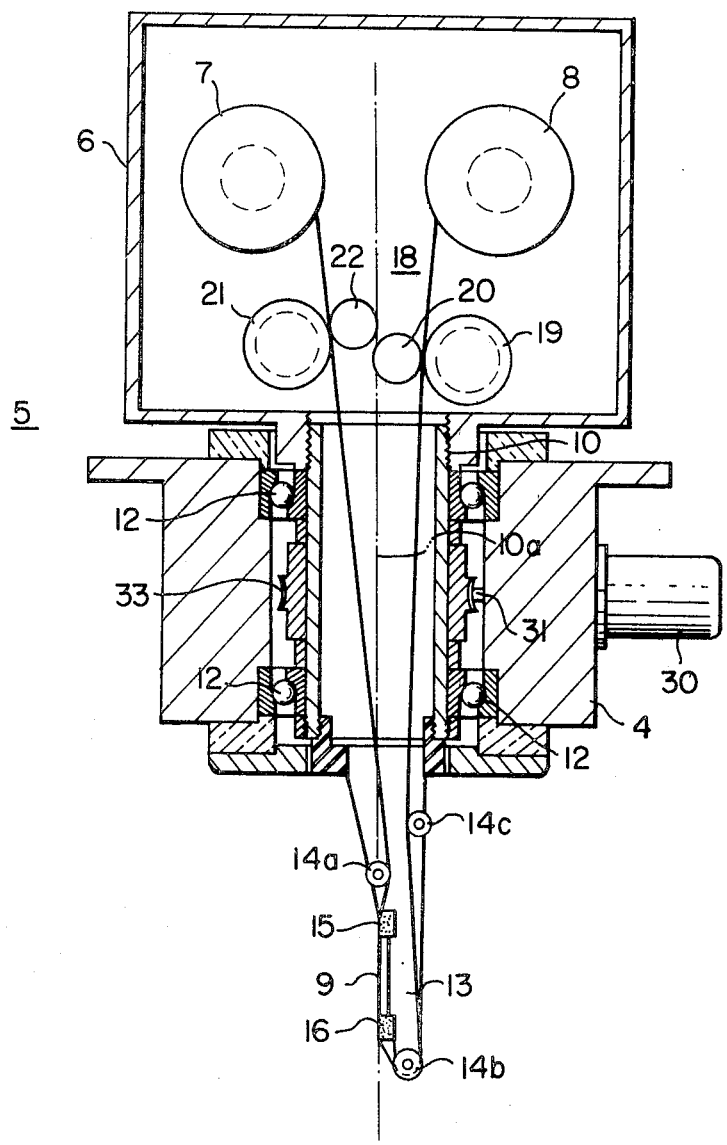

In FIG. 4 there is shown a modified assembly of the embodiment described in which the rotary axis 10a of the carriage 10 is made in agreement with the axis of the wire-electrode 9 between the guides 15 and 16. With such arrangement, as will be seen, it is possible to establish any angular position of orientation of the carriage 10 without interfering relative positions between the axis of the machining wire-electrode 9 and the workpiece 17; hence programming and control are greatly facilitated.

Figure 5:
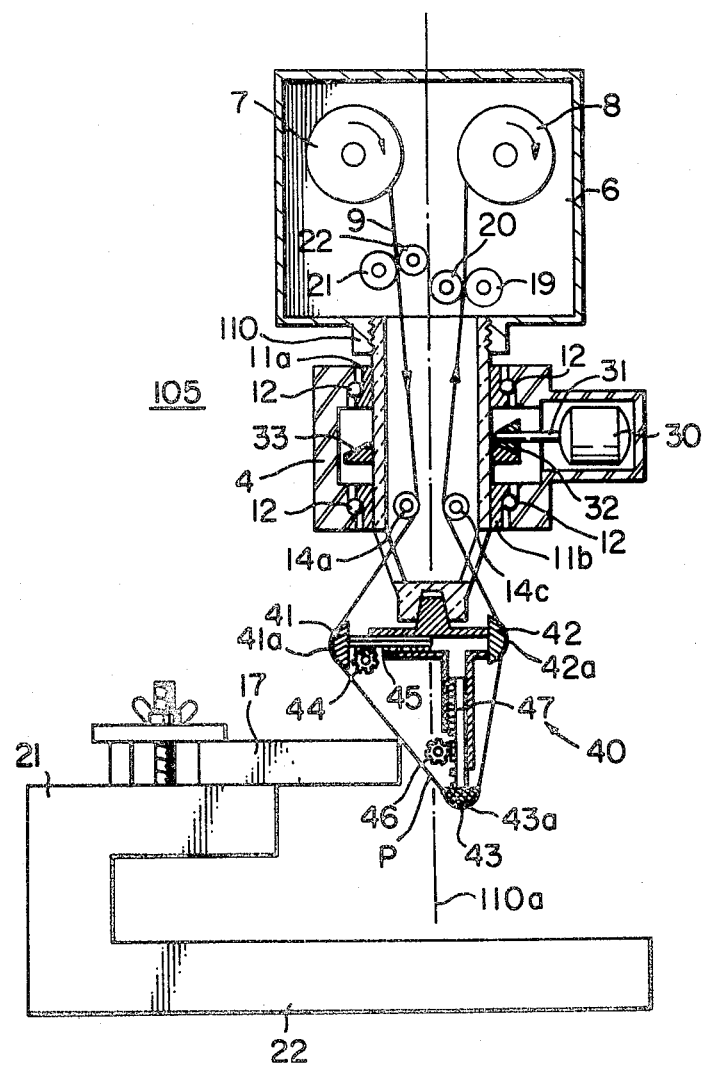

An embodiment 105 of the invention shown in FIG. 5, in which the same reference numerals designate respectively the same or similar parts in the previous embodiments, makes use of a carriage 110 with a frusto-conical lower part which is adapted to detachably hold a wire-electrode guide fixture 40 comprising guides 41, 42 and 43 provided respectively with guide grooves 41a, 42a and 43a. In this case, the guide 41 is provided with a rack 44 and a pinion 45 in engagement therewith while the guide 43 is provided with a rack 46 and a pinion 47 in engagement therewith so that the guide 41 and the guide 43 are displaceable in the horizontal and vertical directions, respectively. This arrangement enables the axis of the wire-electrode 9 in the machining region to be inclined at a desired angle with respect to the workpiece 17, thus permitting a taper-cutting counter-machining operation to be carried out at a desired and variable inclination. It should be noted here that the rotary axis 110a of the carriage 110 and the wire electrode 9 are arranged to cross each other between the guides 41 and 43 so that when a reference surface is established on or in the workpiece 17, the cross point P is caused to move along a counter-machining path on the reference surface through displacement of the cross tables 26 and 27. Such reference surface is typically set at the lower surface of the workpiece 17 although, when the cross point P is located in the vicinity of the guide 41, it may be at the upper surface of the workpiece 17.

Figure 6:
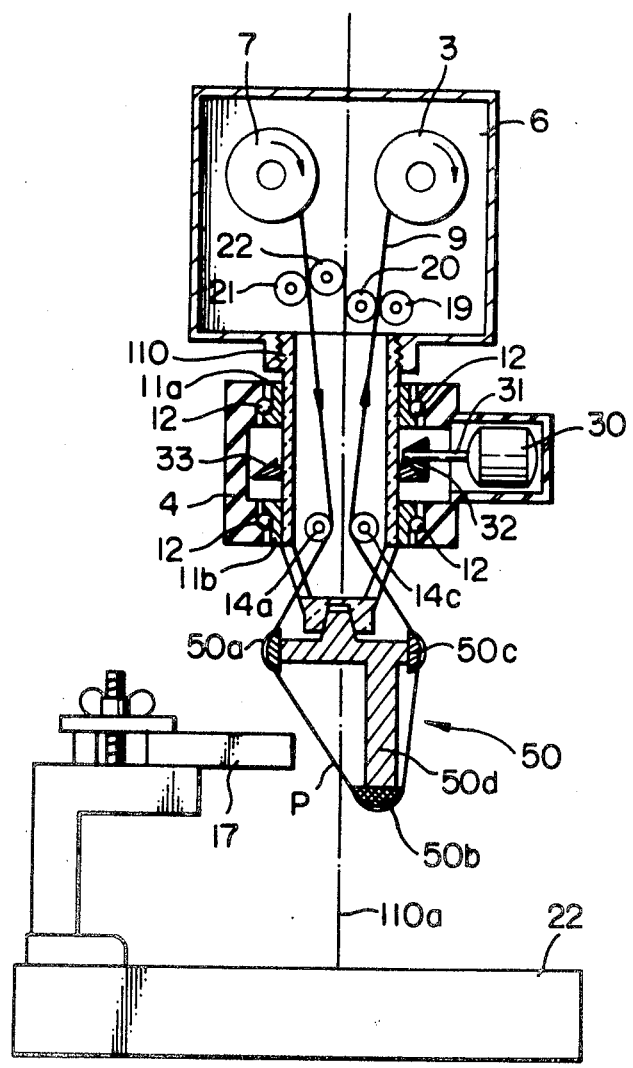

The system of FIG. 6 is designed to use various electrode guide fixtures to be attached to the carriage 110 depending on particular machining purposes. Thus, in lieu of the fixture there shown which is similar in configuration to that of FIG. 5 but with three guides 50a, 50b and 50c all fixed to a supporting arm 50d, the fixture 51 and 52, illustrated in FIGS. 7 and 8, for example, may be mounted on the carrige 110. The fixture 51 represents a tool holder utilized in straight-cutting operations and includes guides 51a and 51b adapted to locate the wire electrode 9 in agreement with the rotary axis 110a of the carriage 110 for the purpose already mentioned and a plurality of wire-electrode spanning and stretching rollers 51e. The fixture 52 represents a tool holder likewise for straight cutting but with a shift d in relation to a programmed path and comprises wire-electrode guides 52a and 52b locating the machining wire electrode 9a with a distance d spaced from the rotary axis 110a of the carriage 110 and also includes guiding rolles 52e as well. Conveniently, units with predetermined but different shifts of this type may be prepared.

FIGS. 9, 10, 11 and 12 illustrate a system of the invention which may eliminate a particular NC program for controlling the angular position of the carriage in order to avoid collision of the electrode assembly with the workpiece by providing contact probes in association with the electrode assembly.

In FIG. 9 the electrode assembly 205 includes a carriage 210 which as in the previous embodiments is rotatably received via a bearing 212 in a tool arm 204 corresponding to the arm 4 in FIGS. 1 and 2. The carriage 210 is also provided with a spur gear 233 in engagement with a spur gear 232 attached at the end of shaft 231 of a pulse motor 230 so that the operation of the latter causes an incremental rotation of the carriage 210 about the rotary axis 210a. In this embodiment, a base 206 carrying a supply reel 7 and a take-up reel 8 for the wire electrode 9 and a wire-drive unit 18 is received within the carriage 210, the latter having a cylindrical guide arm 113 projecting downwardly therefrom and ending at a guide 114 formed with a guide groove 114a. Further there are provided a pair of electrically conductive probes 53 and 54 insulated from the wire electrode 9 extending between the lower end of the carriage 10 and the guide 114 in such a manner that they locate side by side symmetrically with each other from the plane containing the central axis of the guide arm 113 and the rotary axis 210a of the carriage 210 (or the wire electrode 9) as shown in FIG. 10. The probes 53 and 54 are preferably located at positions closer to the guide arm 113 than the rotary axis 210a and such that the spacings between their outer surfaces and the rotary axis 210a do not each exceed the spacing between the rotary axis 210a and the outer surface of the guide surface 113 as shown. In this embodiment, too, the axis of the wire electrode 9 spanning between the guide 114 and the other guide here formed by rollers 21, 22 coincides with rotary axis 210a of the unit 210.

In other words, referring to FIG. 10, the probes 53 and 54 are arranged at locations such that the apex α of a square in which the wire electrode 9a, the probes 53 and 54 and the guide arm 113 are inscribed is of an acute angle and the wire electrode 9a is positioned closer to the probes 53 and 54 than the guide arm 113.

Figure 11:
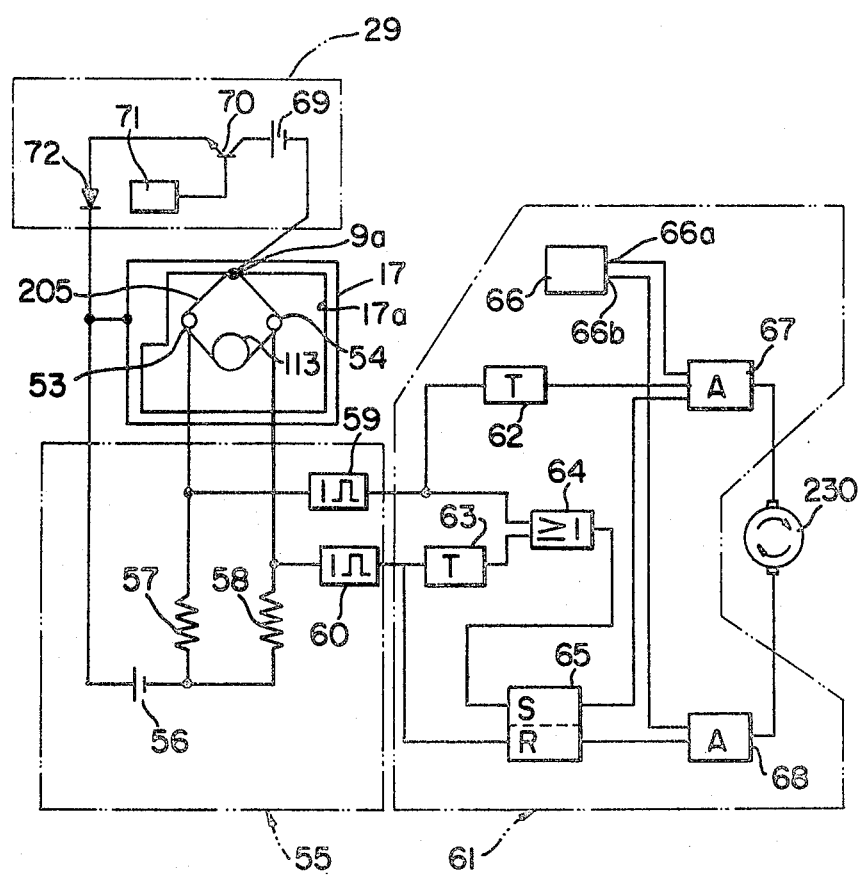
FIG. 11 is a circuit diagram, partly in block form, of a system for use in conjunction with the electrode assembly of FIGS. 9 and 10.

With reference to FIG. 11 in which a system operating with probes 53 and 54 in FIGS. 9 and 10 is shown, a sensing circuit 55 comprises a DC source 56, resistors 57 and 58, and monostable elements 59 and 60 whereas a rotation control circuit 61 for the carriage 210 includes timers 62 and 63, an OR gate 64, an RS bistable element 65, an oscillator 66 and AND gates 67 and 68. A machining power supply 29 (FIG. 1) is also shown comprising a DC source 69, a switching element 70, a pulser 71 and a diode 72 in a scheme well known in the art for applying a series of electrical pulses between the wire electrode 9a and the workpiece 17.

Figure 12:
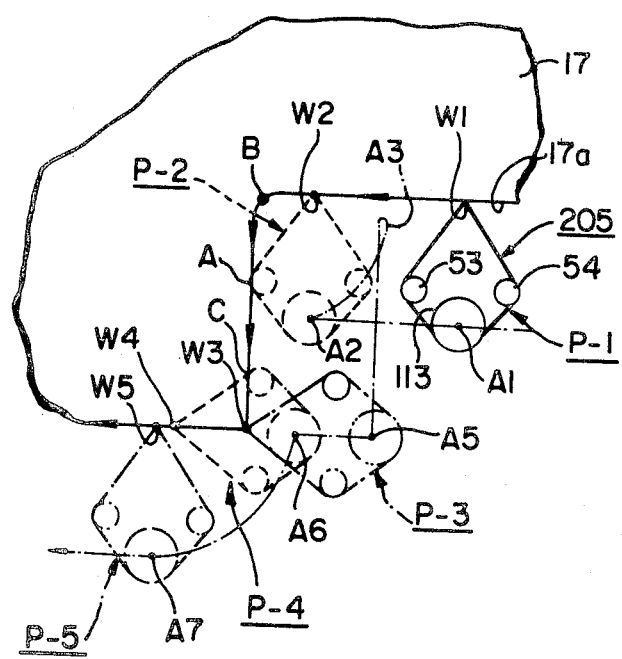
FIG. 12 is a diagrammatic view of a trace of the electrode assembly of FIGS. 9 and 10 in machining a workpiece under control by the system of FIG. 11.

Referring to FIGS. 11 and 12, the electrode assembly 205 is shown in the form of a square form in section by the wire electrode 9a, the guide arm 113 and the probes 53 and 54 and operating in machining the overhung portion 17a of a workpiece 17. While actually the axis of the wire electrode 9a lies always at a fixed position and the workpiece 17 is displaced with respect thereto, the description below will treat the wire electrode 9a as if it moved relative to the fixed workpiece 17 for the sake of clarity and convenience of explanation.

Assuming that the electrode assembly 205 is now located at a position indicated by P-1, the wire electrode 9a is located at a point W1.

When neither of probes 53 and 54 is in contact with the workpiece 17, there will be no current flow through resistors 57 and 58 so that only an "0" signal appears at the outputs of monostable elements 59 and 60, and timers 62 and 63 while the RS bistable element is under "set" condition.

When one of the probes 53 comes in contact with the workpiece 17 at a point A, there develops a current flow through the resistor 57 which triggers the monostable element 59 whose output in turn brings the timer 62 into operation. Then, if the bistable element 65 has been under "reset" condition, it will be brought to "set" state. The timer 62 provides a "1" signal for a predetermined time period following its actuation in which period output pulses supplied from the output terminal 66a of the oscillator 66 are permitted to pass through the AND gate 67 for delivery to rotate the pulse motor 230. The electrode assembly 205 at a position P-2 is thereby rotated counterclockwise while th wire electrode 9a continues to move from the position W2 through a point B toward a point A so that collision or interference between the workpiece 17 and the guide arm 113 is avoided.

As is appreciated, the operating time of the timer 62 and the output frequency of the oscillator 66 are set so as to cause the electrode assembly 205 to rotate by 90 degrees until the wire electrode 9a moves from the position W2 through the point B to reach the point A. This will enable the electrode assembly 205 after having machined the corner portion to stand straight in parallel to the position indicated by the chain line. Thereafter, the unit 205 as so oriented will be displaced downwardly toward the position P-3 and then from the position W3 to the left to machine the portion to reach the point W4.

When the assembly 205 reaches the dash line indicated at P-4, the probe 54 will come in contact with the workpiece 17. In FIG. 11, an electric current is thereby caused to flow through the resistor 58 to trigger the monostable element 60 permitting an output pulse to be delivered. The output pulse acts to bring the RS bistable element 65 into "reset" condition and also to actuate the timer 63. The timer 63 acts as a delay circuit delivering after the lapse of a predetermined time period a short output pulse which returns the RS bistable element 65 into "set" condition. While the bistable element 65 is being under the "reset" condition, pulses outgoing from the terminal 66b of the oscillator 66 are permitted to pass through the AND gate 68 thereby causing the motor 230 to rotate in the direction opposite to that mentioned previously. Here, pulses delivered from the output terminal 66b are set to be of a higher frequency than those from the output terminal 66a so that the assembly 205 is rotated by 90 degrees clockwise during the short time in which the wire electrode 9a is displaced from the position W4 to W5. The short pulse from the timer 63 will then return the bistable element 65 to terminate the rotation of the motor 230. In the meantime, the guide arm 113 is displaced drawing an arc from the point A6 to the point A7. In this manner, machining can be carried out throughout the entire path of the periphery of the overhung portion 17a of the workpiece 17 without collision or interference between the guide arm 113 and the workpiece 17.

Figure 13:
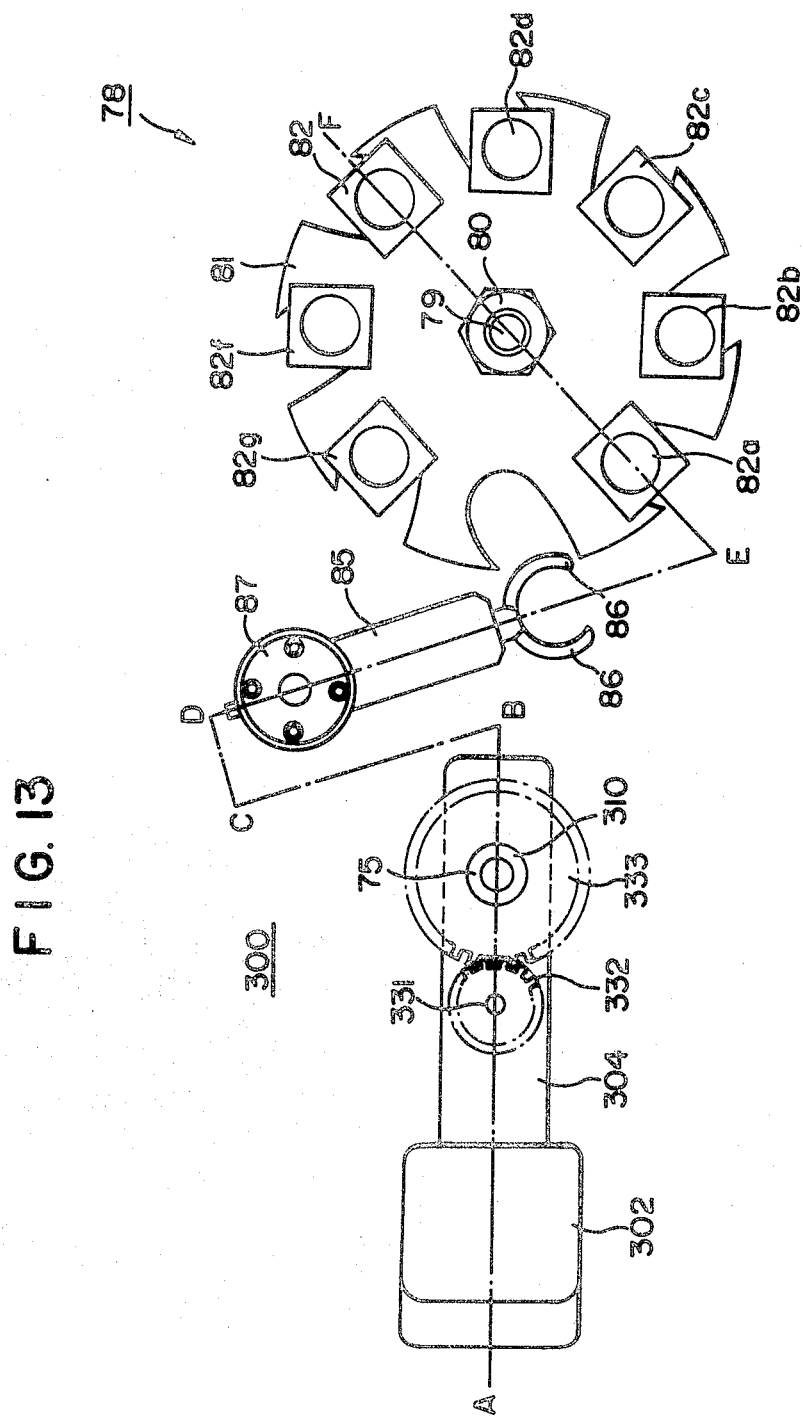
FIG. 13 is a plan view of an improved electroerosion machine incorporating an automatic tool changer and a tool magazine carrying an electrode assembly according to the invention as well as various cavity-sinking electrodes.

In FIGS. 13 and 14, there is shown, in accordance with a further aspect of the invention, a novel electro-erosion machine 300 incorporating a wire-electrode assembly 305. Here again, the assembly comprises a base member 306 carrying a supply reel 307 and a take-up reel 308 for a travelling wire electrode 309 and detachably mounted to a carriage 310 which in turn is rotatably received in a tool arm 304 with a motor 330 transmitting a rotary motion to the carriage 310 via a drive shaft 331 and spur gears 332 and 333 in the manner described previously. The tool arm 304 is mounted on a column 302 of the machine 330 having X-Y cross tables and is arranged to be displaceable up and down to establish machining and preparatory positions in the vertical direction (FIGS. 1 and 2). The wire electrode 309 is transported under tension by means of drive and brake roller arrangements 319, 320 and 321 over guides 314, 315 and 316 attached to a support arm 313 which in turn is mounted to the base member 306.

The carriage 310 is provided with a vacuum compartment 310a communicating via a duct 310b with a universal joint 75 which in turn communicates with a vacuum pump 76 via a three-way valve 77 so that they constitute a vacuum retainer for the unit 305 and other electrodes to be presented to the carriage 310.

Further provided in this embodiment is a tool storage magazine 78 rotatably supported by a shaft 79 with a nut 80 and having a rotary table 81 which carries diverse electroerosion electrodes 82a, 82b, 82c, 82d, 82e, 82f, 82g to be successively utilized for drilling and/or cavity-sinking operations.

A tool changer 83 in this embodiment comprises a hydraulic cylinder 84, a rotary arm 85 having at its free end a grip 86 for holding and transferring tools 82a-82g from the tool storage magazine 78 to the carriage 310, a head 87 supporting the tool transfer arm 85 and a hydraulic cylinder 88 for rotating the head 87. The hydraulic cylinder 84 is supplied via a four-way valve 89 with a high-pressure operating fluid to make adjustment of the vertical position of the rotary arm 85 at a predetermined level in conjunction with levels of the rotary table 81 and the carriage 310. The opening and closure operation of the grip 86 is effected by a known hydraulic or electromechanical device contained in the head 87 to receive a particular tool electrode from the magazine 78 and to present it to the carriage 310 upon rotation of the arm 85 to the position thereof.

The rotation of the electrode magazine 78, the operation of the tool changer 83, the vertical displacement of the tool arm 304, the rotation of the carriage 310 and the switching of the three-way valve 77 are all controlled by a central control unit (not shown). Tool electrodes 82a to 82g carried by the magazine 78 are successively transferred and successively replaced by the tool changer 83 in the order of their arrangement to and from the carriage 310 in a scheme well known in the field of machine tools.

There is thus provided a novel electrode assembly for a travelling-wire electroerosion machine as well as a novel electro-erosion machine which permits diverse machining applications which have been hitherto only achieved with difficulties and inconvenience.

We claim:

1. An electrode head assembly for a traveling-wire electroerosion machine, said assembly comprising:
   a base member carrying thereon a wire-electrode supply member and a wire-electrode take-up member;
   a plurality of guide members for guiding under tension between said supply and take-up members a traveling-wire electrode along a predetermined path including a machining region which is, in the use of the assembly, comprised of the traveling-wire electrode and a workpiece juxtaposed therewith in the presence of a machining medium;
   a carriage adapted to be coupled rotatably to an arm member mounted for displacement on the electroerosion machine, said carriage carrying said base member and including a support member carrying at least some of said guide members at predetermined locations;
   wire drive means for advancing said wire electrode from said supply member to said take-up member along said predetermined path; and
   rotary means operable in response to a control signal for rotating said carriage to control the angular position thereof relative to said arm member, said guide members carried by said support member being arranged so as to position said wire electrode in said machining region coaxially with the rotary axis of said carriage.

2. An electrode head assembly for a traveling-wire electroerosion machine, said assembly comprising:
   a base member carrying thereon a wire-electrode supply member and a wire-electrode take-up member;
   a plurality of guide members for guiding under tension between said supply and take-up members a traveling-wire electrode along a predetermined path including a machining region which is, in the use of the assembly, comprised of the traveling-wire electrode and a workpiece juxtaposed therewith in the presence of a machining medium;
   a carriage adapted to be coupled rotatably to an arm member mounted for displacement on the eletroerosion machine, said carriage carrying said base member and including a support member carrying at least some of said guide members at predetermined locations;
   wire drive means for advancing said wire electrode from said supply member to said take-up member along said predetermined path; and
   rotary means operable in response to a control signal for rotating said carriage to control the angular position thereof relative to said arm memmber, some of said guide members being provided with means for displacement relative to one another in mutually orthogonal direction so as to enable said wire electrode in said machining region to be inclined at a desired angle relative to the rotary axis of said carriage.

3. The assembly according to claim 2 wherein said some of said guide members on said support member are provided with means to cause said wire electrode in said machining region to intersect said rotary axis of said carriage at a position lying in the plane of the lower surface of said workpiece.

4. The assembly according to claim 2 wherein said some of said guide members on said support member are provided with means adjustable so as to cause said wire electrode in said machining region to intersect said rotary axis of said carriage at a position lying in the plane of the upper surface of said workpiece.

5. The assembly according to claim 1, claim 2, claim 3 or claim 4 wherein said carriage is provided with a plurality of generally similar support members, each of said support members being detachably mounted on said carriage, each of said support members having guide members as previously defined of its own arranged in different configurations so as to provide various different configurations of said wire electrode path in said machining region for use as required in successive machining operations.

6. An electrode head assembly for a traveling-wire electroerosion machine, said assembly comprising:
   a base member carrying thereon a wire-electrode supply member and a wire-electrode take-up member;
   a plurality of guide members for guiding under tension between said supply and take-up members a traveling-wire electrode along a predetermined path including a machining region which is, in the use of the assembly, comprised of the traveling-wire electrode and a workpiece juxtaposed therewith in the presence of a machining medium;

a carriage adapted to be coupled rotatably to an arm member mounted for displacement on the electroerosion machine, said carriage carrying said base member and including a support member carrying at least some of said guide members at predetermined locations;

wire drive means for advancing said wire electrode from said supply member to said take-up member along said predetermined path;

rotary means operable in response to a control signal for rotating said carriage to control the angular position thereof relative to said arm member; and probing means associated with said support member and responsive to a predetermined approach of the support member to the workpiece for altering the angular orientation of the assembly relative to said workpiece.

7. The assembly according to claim 6, wherein said probing means includes a pair of probes disposed symmetrically about a plane containing the rotary axis of said carriage and a central axis of said support member.

8. The assembly according to claim 7, wherein each of said probes is constructed and arranged to provide an electrically-conductive path therethrough and said workpiece when in contact therewith.

9. An electrode head assembly for mounting on a vertically-displaceable tool arm of a traveling-wire electroerosion machine, said assembly comprising:

(a) a base member carrying thereon electrode wire-supply and take-up members between which, when said assembly is in operation on said machine, an electrode wire extends under tension;

(b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;

(c) wire driving means for advancing said electrode wire along said path from said supply member to said take-up member;

(d) a carriage arranged to be rotatably supported on said tool arm and to carry said base member and a support member, said support member including as a part thereof at least some of said guide members at predetermined locations along said path; and (e) carriage rotation means secured to said carriage for enabling said carriage, when rotatably supported in said tool arm, to be rotated relative to that tool arm in a manner such as will avoid mechanical interference of any part of said support member with said workpiece when one of said electrode wire and said workpiece is guided relative to the other along a predetermined machining course, said guide members on said support member being arranged so as to position said electrode wire in said machining region coaxially with an axis about which said carriage is arranged for rotation relative to said tool arm.

10. An electrode head assembly for mounting on a vertically-displaceable tool arm of a traveling-wire electroerosion machine, said assembly comprising:

(a) a base member carrying thereon electrode wire-supply and take-up members between which, when said assembly is in operation on said machine, an electrode wire extends under tension;

(b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;

(c) wire driving means for advancing said electrode wire along said path from said supply member to said take-up member;

(d) a carriage arranged to be rotatably supported on said tool arm and to carry said base member and a support member, said support member including as a part thereof at least some of said guide members at predetermined locations along said path; and (e) carriage rotation means secured to said carriage for enabling said carriage, when rotatably supported in said tool arm, to be rotated relative to that tool arm in a manner such as will avoid mechanical interference of any part of said support member with said workpiece when one of said electrode wire and said workpiece is guided relative to the other along a predetermined machining course, said guide members on said support member being arranged so as to position said electrode wire in said machining region parallel with, but spaced from, an axis about which said carriage is arranged for rotation relative to said tool arm.

11. An electrode head assembly for mounting on a vertically-displaceable tool arm of a traveling-wire electroerosion machine, said assembly comprising:

(a) a base member carrying thereon electrode wire-supply and take-up members between which, when said assembly is in operation on said machine, an electrode wire extends under tension;

(b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;

(c) wire driving means for advancing said electrode wire along said path from said supply member to said take-up member;

(d) a carriage arranged to be rotatably supported on said tool arm and to carry said base member and a support member, said support member including as a part thereof at least some of said guide members at predetermined locations along said path; and (e) carriage rotation means secured to said carriage for enabling said carriage, when rotatably supported in said tool arm, to be rotated relative to that tool arm in a manner such as will avoid mechanical interference of any part of said support member with said workpiece when one of said electrode wire and said workpiece is guided relative to the other along a predetermined machining course, some of said guide members on said support members being displaceable relative to one another in mutually orthogonal directions so as to enable said electrode wire in said machining region to be inclined at a desired angle relative to an axis about which said carriage is arranged for rotation relative to said tool arm.

12. An assembly according to claim 11 wherein said some of said guide members on said support member are provided with means for adjustment so as to cause said electrode wire in said machining region to intersect said rotational axis of said carriage at a position lying in the plane of the lower surface of said workpiece.

13. An assembly according to claim 11 wherein said some of said guide members on said support member are provided with means for adjustment so as to cause said electrode wire in said machining region to intersect said rotational axis of said carriage at a position lying in the plane of the upper surface of said workpiece.

14. An assembly according to claim 9, claim 10, claim 11, claim 12 or claim 13, wherein said carriage is provided with a plurality of such support members, each one of which may be detachably carried in turn on said carriage and each one of which has its said guide members arranged in different configurations so as to provide various different configurations of said electrode wire path in said machining region for use as required in successive machining operations.

15. An electrode head assembly for mounting on a vertically-displaceable tool arm of a traveling-wire electroerosion machine, said assembly comprising:
   (a) a base member carrying thereon electrode wire-supply and take-up members between which, when said assembly is in operation on said machine, an electrode wire extends under tension;
   (b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;
   (c) wire driving means for advancing said electrode wire along said path from said supply member to said take-up member;
   (d) a carriage arranged to be rotatably supported on said tool arm and to carry said base member and a support member, said support member including as a part thereof at least some of said guide members at predetermined locations along said path; and
   (e) carriage rotation means secured to said carriage for enabling said carriage, when rotatably supported in said tool arm, to be rotated relative to that tool arm in a manner such as will avoid mechanical interference of any part of said support member with said workpiece when one of said electrode wire and said workpiece in guided relative to the other along a predetermined machining course, said support member being provided with probing means for detecting, when the assembly is in operation in said machine, the presence of said workpiece in predetermined close proximity with said support member and providing a signal in response thereto.

16. An assembly according to claim 15, wherein said probing means comprises two probes disposed symmetrically on either side of a central plane which includes a rotational axis of said carriage and a central axis of said support member.

17. An assembly according to claim 15 or claim 16, wherein said probing means comprises one or more probes carried by said support member, each such probe being constructed and arranged to provide an electrically conductive path through itself and said workpiece when in contact therewith, whereby the need for rotation of said carriage and support member to avoid mechanical interference of said support member with said workpiece is signalled.

18. A method of electroerosion machining a workpiece comprising the steps of:
   (a) advancing a traveling-wire electrode under tension between wire-supply and take-up members along a path which is defined by guide members at least some of which are carried on a rotatable support member and which path traverses a machining region in which a workpiece for electroerosion machining is positioned in electroerosion machining relationship with a stretch of said wire electrode which is supported by said guide members carried by said support member;
   (b) guiding one of said wire electrode and said workpiece relative to the other along a predetermined machining course and energizing said wire electrode said workpiece whereby to effect electroerosion machining;
   (c) rotating said support member as required during machining operations whereby to alter the angular orientation of said wire electrode path relative to said workpiece in a manner such as to avoid mechanical interference of said support member and/or an associated guide member with said workpiece;
   (d) detecting, as occasion arises, the presence of said workpiece in predetermined close proximity with said support member and generating in response to such detection of said workpiece a signal; and
   (e) rotating said support member in response to each said control signal by an amount and in a sense such as will avoid any said mechanical interference of said support member and/or guide member with said workpiece.

19. A method of electroerosion machining a workpiece comprising the steps of:
   (a) advancing a traveling-wire electrode under tension between wire-supply and take-up members along a path which is defined by guide members at least some of which are carried on a rotatable support member and which path traverses a machining region in which a workpiece for electroerosion machining is positioned in electroerosion machining relationship with a stretch of said wire electrode which is supported by said guide members carried by said support member;
   (b) guiding one of said wire electrode and said workpiece relative to the other along a predetermined machining course and energizing said wire electrode said workpiece whereby to effect electroerosion machining;
   (c) rotating said support member as required during machining operations whereby to alter the angular orientation of said wire electrode path relative to said workpiece in a manner such as to avoid mechanical interference of said support member and/or an associated guide member with said workpiece;
   (d) detecting, as occasion arises, the presence of said workpiece in predeterined close proximity with said support member on one side of a central plane which includes the axis of rotation about which said support member is rotatable and a central axis of said support member, generating a first control signal in response to each such detection of said workpiece, and rotating said support member in response to each said first control signal by an amount, at a speed, and in a sense such as will avoid any said mechanical interference of said support member and/or guide member with said workpiece; and (e) detecting, as occasion arises, the presence of said workpiece in predetermined close proximity with said support member on the opposite side of said central plane, generating a second control signal in response to each such last-mentioned detection of said workpiece, and rotating said support member by an amount, at a speed, and in a sense such as will avoid any such mechanical interference of said support member and/or guide member with said workpiece.

20. A method according to claim 19, wherein said support member is rotated in response to a said second control signal by an amount that is the same as the amount by which said support member is rotated in response to a said first control signal.

* * * * *